United States Patent [19]

Iseki et al.

[11] Patent Number: 5,503,697
[45] Date of Patent: Apr. 2, 1996

[54] METHOD FOR PRESSURE-ADHERING A JOINT PORTION OF A TIRE BUILDING COMPONENT MATERIAL

[75] Inventors: Tsutomu Iseki, Fukushima; Youichi Endo, Shirakawa; Masakazu Taguchi, Fukushima, all of Japan

[73] Assignee: Sumitomo Rubber Industries, Ltd., Hyogo, Japan

[21] Appl. No.: 380,505

[22] Filed: Jan. 30, 1995

Related U.S. Application Data

[62] Division of Ser. No. 273,907, Jul. 12, 1994, Pat. No. 5,417,795.

[30] Foreign Application Priority Data

Jul. 19, 1993 [JP] Japan .................. 5-178223

[51] Int. Cl.[6] .................................. B29D 30/28
[52] U.S. Cl. .................. 156/111; 156/130.3; 156/130.7; 156/135
[58] Field of Search .................. 156/111, 130.3, 156/130.7, 131, 132, 134, 133, 135, 421, 396, 421.6, 408, 400–402

[56] References Cited

U.S. PATENT DOCUMENTS

| | | |
|---|---|---|
| 2,500,273 | 3/1950 | Breth . |
| 2,688,996 | 9/1954 | Loomis .................................. 156/134 |
| 3,721,600 | 3/1973 | Cantarutti .............................. 156/132 |
| 4,163,685 | 8/1979 | Kubinski . |
| 4,278,484 | 7/1981 | McGaughey ........................... 156/132 |
| 4,443,290 | 4/1984 | Loeffler et al. ........................ 156/111 |
| 4,478,672 | 10/1984 | Precht ................................... 156/421 |
| 4,790,899 | 12/1988 | Sacco .................................... 156/421 |

FOREIGN PATENT DOCUMENTS

| | | |
|---|---|---|
| 0253067 | 1/1988 | European Pat. Off. . |
| 2074044 | 10/1971 | France . |
| 2800729 | 7/1979 | Germany . |
| 52-35709 | 9/1977 | Japan . |
| 56-106847 | 8/1981 | Japan . |
| 3272833 | 4/1991 | Japan . |

*Primary Examiner*—Geoffrey L. Knable
*Attorney, Agent, or Firm*—Birch, Stewart, Kolasch & Birch

[57] ABSTRACT

An improved method for pressure-adhering tire building component material is provided which includes the steps of:

(1) adhering sidewalls to a first cover;
(2) cutting each of the sidewalls at a given portion thereof;
(3) provisionally securing a joint portion defined by the cut ends of each of the sidewalls;
(4) enfolding a bead portion with a bead edge of the sidewall and entirely pressure-adhering each sidewall to the first cover; and
(5) pressure-adhering the joint portion provisionally secured with a machine, wherein the step (5) is carried out separately from a production line in which the steps (1) to (4) are carried out.

2 Claims, 7 Drawing Sheets

METHOD FOR PRESSURE-ADHERING A JOINT PORTION OF A TIRE BUILDING COMPONENT MATERIAL

This application is a divisional of application Ser. No. 08/273,907, filed on Jul. 12, 1994, now U.S. Pat. No. 5,417,795.

BACKGROUND OF THE INVENTION

The present invention generally relates to the manufacture of tires for automobiles. More particularly, it relates to a method for pressure-adhering a joint portion of a tire building component material, and an apparatus used therefor.

In the manufacture of radial tires for automobiles, the tire building process includes a first stage wherein an inner liner and a ply carcass are wound onto a cylindrical drum, a bead member is fixed to each end of the ply carcass by bending the end of the ply carcass to wrap up the bead member to build a first cover, and sidewalls and the like are later adhered thereto, and a second stage wherein the first cover is formed into a toroidal shape, followed by adhering a breaker reinforcement layer, a tread and the like onto the outer periphery of the first cover.

The present invention is directed to a method for pressure-adhering edge portions of tire building component materials such as sidewalls in the first stage of the tire building process, and to an apparatus used therefor. More specifically, is the present invention is directed to such a method capable of dispensing with the skill of a pressure-adhering operator, eliminating the burden imposed on the operator and reducing the operation time period required by pressure-adhering joint portions of tire building material with the use of an apparatus separate from a tire building apparatus, and to the apparatus used therefor.

In the production process for rubber products such as tires and belts, in general, it is necessary to join together rubber component materials reinforced with fibers or the like such as carcass, belt, sidewall, inner liner and bead. This joining step needs to be performed quickly and assuredly for improving the quality of a tire or belt.

FIGS. 4 to 8 illustrate a conventional method of pressure-adhering a joint portion of a sidewall in a tire building process. This conventional pressure-adhering method is summarized in brief as follows:

(1) adhering sidewalls to a first cover (refer to FIG. 4);

(2) cutting each sidewall automatically or manually (refer to FIG. 5);

(3) mating the cut end portions of each sidewall with each other to form the joint portion (refer to FIG. 6);

(4) pressure-adhering the joint portion completely with the use of a pressing roller or the like (refer to FIG. 7); and (5) enfolding the bead portion of each sidewall and entirely pressure-adhering each sidewall to the first cover (refer to FIG. 8).

After the above procedure has been completed, the first cover is removed from the drum and then fed to the subsequent step.

In the step of pressure-adhering the joint portion of each sidewall as shown in FIG. 7, the joint portion 91 must be strongly compressed with a hand-operated roller 90 and completely crushed. This operation requires the skill and burden of an operator. Further, the tire building apparatus must be stopped during this operation and hence cannot be utilized effectively. Apparatus for automatically performing such pressure-adhering operation are disclosed in, for example, Japanese Unexamined Patent Publication No. 35709/1977 and Japanese Examined Patent Publication No. 106847/1981. Although these apparatuses do not require the skill and burden of an operator, they have a pressing roller mounted on the tire building apparatus and, hence, the apparatus must be stopped during the pressure-adhering operation. This unavoidably results in losses in the tire building process. Further, the apparatus demand fine adjustments depending on the kind of tire building component and hence cannot be simplified.

The present invention has been attained to overcome the foregoing problems. It is, therefore, an object of the present invention to provide a pressure-adhering method which can dispense with the skill of an operator, relieve the operator of burden and eliminate the losses in the tire building process, and an apparatus used therefor.

SUMMARY OF THE INVENTION

In accordance with one aspect of the present invention, there is provided a method for pressure-adhering a joint portion of a tire building component material, comprising the steps of:

(1) adhering sidewalls to a first cover;

(2) cutting each of the sidewalls at a given portion thereof;

(3) provisionally securing a joint portion defined by the cut ends of each of the sidewalls;

(4) enfolding a bead portion with a bead edge of the sidewall and entirely pressure-adhering each sidewall to the first cover; and (5) pressure-adhering the joint portion provisionally or initially with a machine, wherein the step (5) is carried out separately from a production line in which the steps (1) to (4) are carried out.

In accordance with another aspect of the present invention, there is provided an apparatus for pressure-adhering a joint portion of a tire building component material, comprising: a vertically movable table for placing thereon a first cover in a state where a joint portion of the component material is provisionally or initially; and a vertically movable roller means having a means for fixing the first cover, rollers for compressing the first cover from the inside and outside of the first cover, and a means for causing the rollers to move vertically.

In the present invention, firstly the joint portion of a tire building component is not pressure-adhered but provisionally secured, and after the completion of the steps other than the pressure-adhering step, the provisionally secured joint portion is completely pressure-adhered in a separate line.

These and other objects, features and advantages of the present invention will be apparent from the following description in which the preferred embodiments are set forth in detail in conjunction with the accompanying drawings.

DETAILED DESCRIPTION

The present invention will now be described in detail with reference to the drawings.

Figure 4:
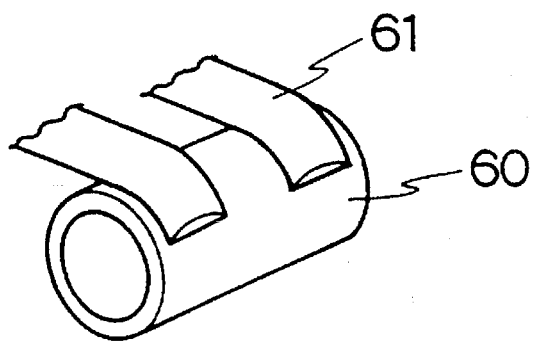
FIGS. 4 to 8 are process drawings of a part of a conventional tire building process.
Figure 5:
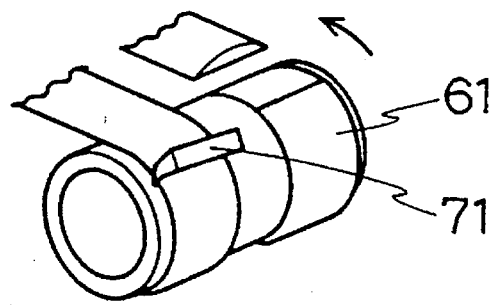
Figure 6:
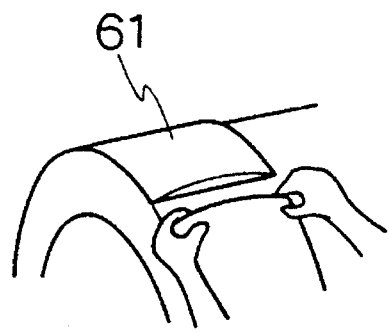
Figure 7:
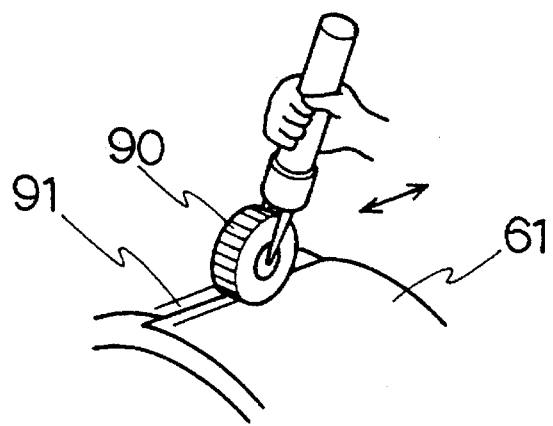

As already described, the method and apparatus of the present invention are associated with the adhering of sidewalls to a cylindrical drum in the first stage of a tire building process. In the first stage, the steps of adhering sidewalls 61 to a cylindrical drum 60, cutting the sidewalls 61 with, for example, a cutter 71 and joint-mating the cut ends of each sidewall are carried out in the same manner as in the prior art shown in FIGS. 4 to 6.

Figure 3:
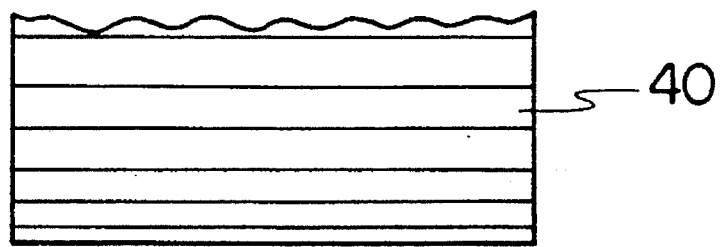
FIG. 3 is a schematic representation for explaining the step of provisionally securing the joint portion of a tire building component material in a tire building process according to the present invention.
Figure 3:
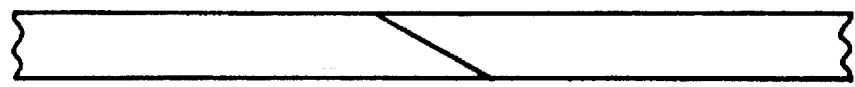
Figure 8:
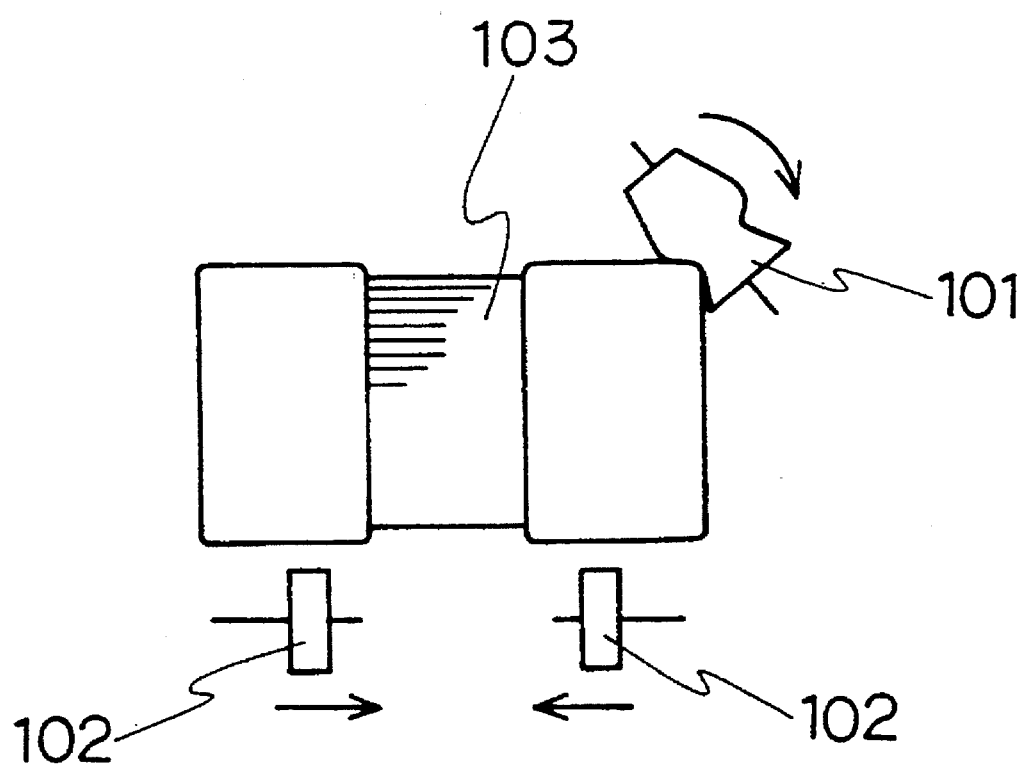
Figure 9:
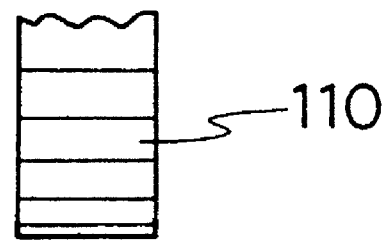
FIG. 9 is a schematic illustration for explaining an overlapped state of the joint portion in the conventional tire building process.
Figure 9:
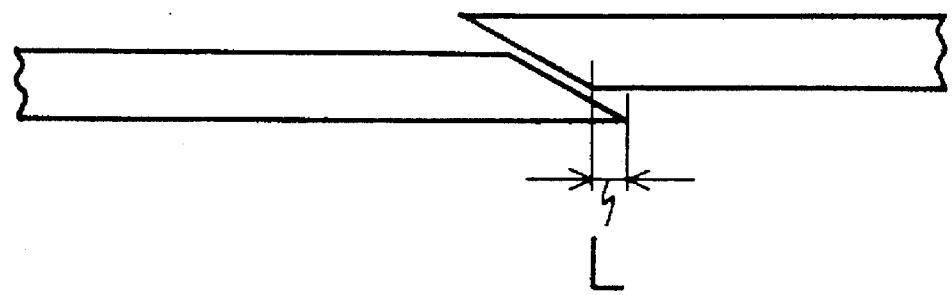

In the joint-mating step, the joint portion is provisionally secured as shown in FIG. 3 with no provision of an overlap portion L as shown in FIG. 9. Conventionally, the joint portion has been pressure-adhered at this stage. In the present invention, however, with the joint portion being kept provisionally secured, a bead portion is enfolded with a bead edge of the sidewall and then the sidewall is entirely pressure-adhered to the first cover before pressure-adhering the joint portion thereof. To entirely pressure-adhere herein is meant to evenly pressure-adhere the sidewalls to the case of the first cover, and this step also is carried out in the conventional manner as shown in FIG. 8. In the step shown in FIG. 8, the bead portion is enfolded with portions of the sidewalls at opposite ends of the cylindrical first cover and the portions of the sidewalls are pressure-adhered to the first cover using a roller 101. Then the sidewalls are pressure-adhered to the case 103 over the entire width thereof by roiling a roller 102 from the opposite peripheral edges of the case 103 toward the center thereof.

The conventional joint-mating step has been achieved by forming an overlap portion L of about 2 to about 5 mm and crushing the overlap portion L with a roller 110 of 8 to 10 mm width, as shown in FIG. 9. In the present invention, however, the joint portion is provisionally secured with no provision of the overlap portion, as shown in FIG. 3. The joint portion is kept provisionally secured in this line by using a consolidation roller 40, and the pressure-adhering of the joint portion is performed using a consolidation roller 41, 42 in a separate line as will be described later. Where the joint portion having no overlap portion is pressure-adhered using the roller 110 instead of the consolidation roller 40, the pressure-adhered portion would undesirably be shaped as depressed. In this embodiment, however, the use of the consolidation roller of, for example, 50 mm width will never cause the joint portion to be shaped as depressed. Further, since the overlap portion is not formed, the variation of joint amount from one tire to another is lessened. Still further, the pressure-adhering operation using the machine minimizes the variation in adhering pressure and pressure-adhered area, thereby improving the tire uniformity. This is particularly preferable where the sidewall is of a material having a large gauge difference (degree of variation in thickness of the sidewall in section), particularly of a material, which requires high adhering precision to avoid disadvantage in appearance, such as a white sidewall having characters in the sidewall portion thereof.

Figure 1:
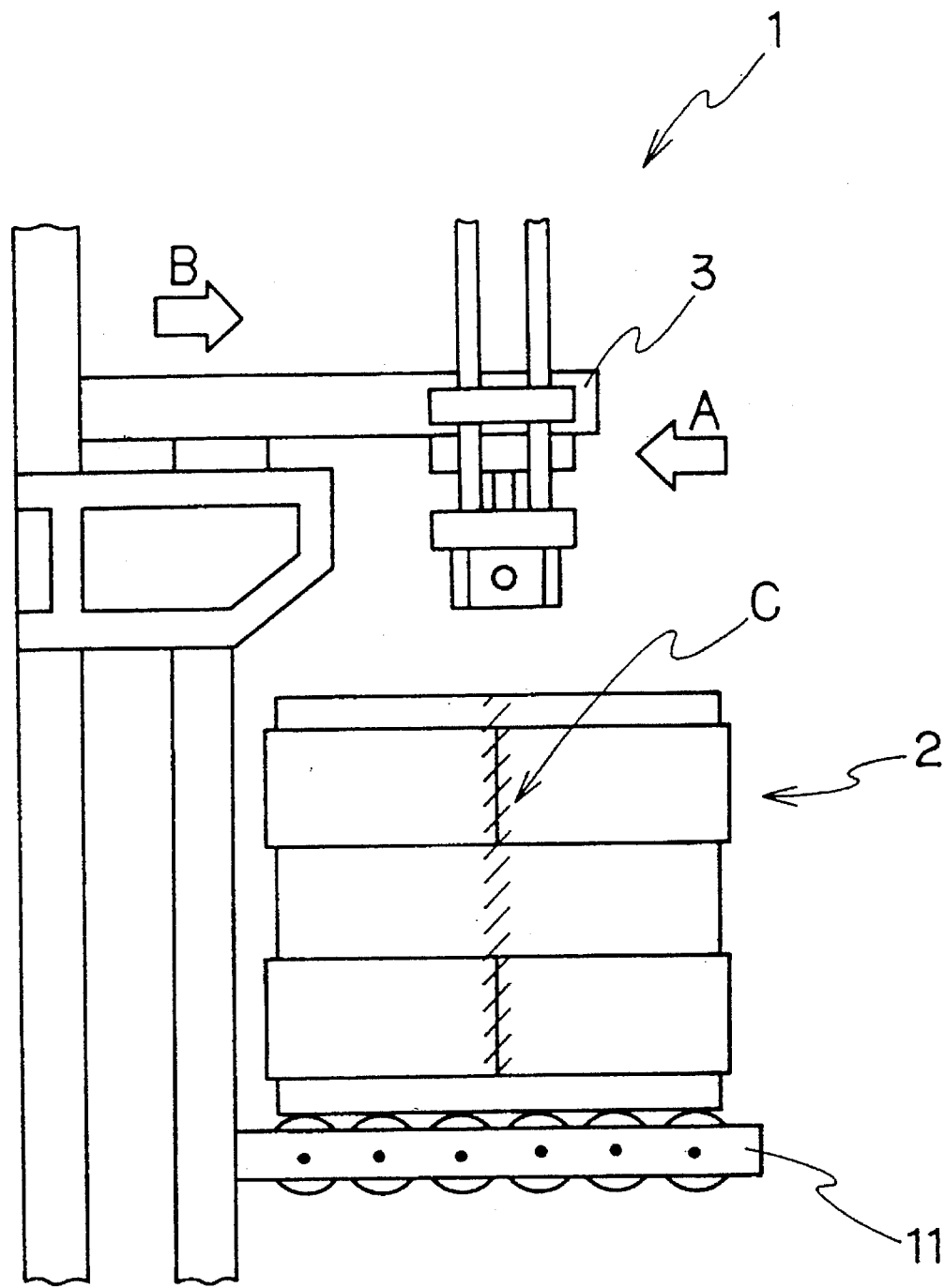
FIG. 1 is a side elevation of a pressure-adhering apparatus according to the present invention.
Figure 2:
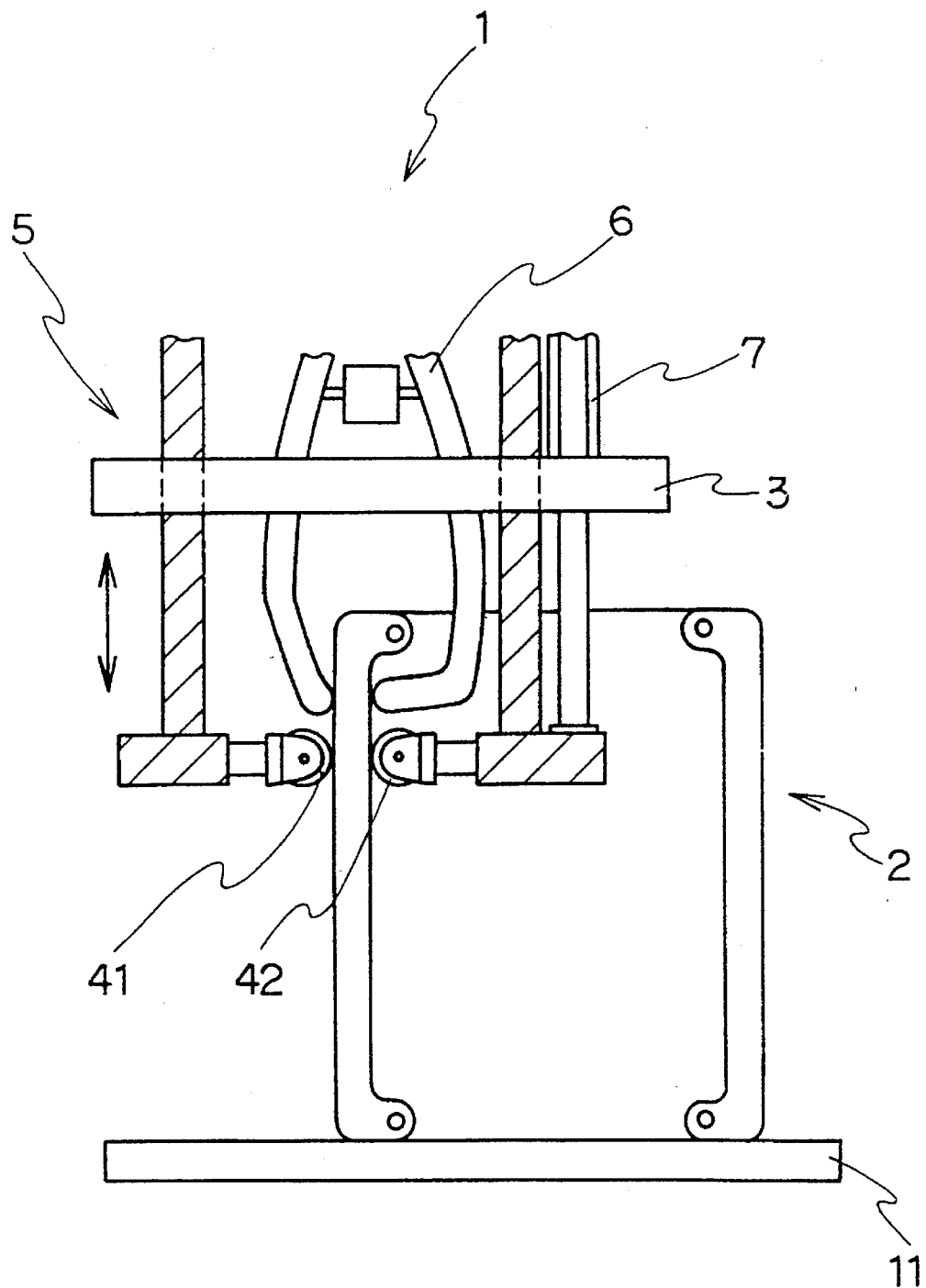
FIG. 2 illustrates the pressure-adhering apparatus as viewed in the direction indicated by arrow A of FIG. 1.

In turn, the first cover in a state where each bead portion has been enfolded and sidewalls are entirely pressure-adhered to the case of the first cover with the joint portion kept provisionally secured is placed on a pressure-adhering apparatus 1. FIG. 1 is a side elevation of the pressure-adhering apparatus 1; and FIG. 2 illustrates the apparatus 1 as viewed in the direction indicated by arrow A. After bead portions have been enfolded and sidewalls have been entirely pressure-adhered to the case of the first cover 2 in a conventional production line, the first cover 2 is released from the drum of the tire building apparatus and placed on table 11 of the pressure-adhering apparatus 1 with its axis oriented vertically and with the joint portions of the sidewalls positioned as coinciding with a set position of pressure-adhering rollers.

Upon the placing of the first cover 2 on the table 11, a consolidation roller mechanism 5 having consolidation rollers 41, 42 is moved forward (in the direction indicated by arrow B) along a frame 3 by means of an air cylinder (not shown). The table 11 is then raised to a predetermined level by chain drive, followed by fixing the first cover 2 at an upper portion thereof by means of a clamp 6. FIG. 2 illustrates this state. The clamp 6 is caused to perform its fixing operation by a cylinder provided above.

When the clamp 6 fixes the upper portion of the first cover 2, the joint portion to be pressure-adhered is sandwiched between the roller 41 on the outside surface of the first cover 2 and the roller 42 on the inside surface thereof. These rollers are driven up and down by the air cylinder to achieve the pressure-adhering operation. This up-and-down movement might be performed once or repeated twice or more times. Prior to the fixing of the upper portion of the first cover 2 by the clamp 6, a laser marker is projected along the reciprocation path of the consolidation rollers 41, 42 (the hatched portion C in FIG. 1 is the projection line), and the joint portion to be pressure-adhered is positioned as aligning with this portion C.

Each consolidation roller is in the form of, for example, a cylinder having a length of about 50 mm and a diameter of about 45 mm and knurled in a V-shaped fashion with a depth of about 0.2 to about 0.5 mm and at intervals of about 1 mm.

When the pressure-adhering operation is completed, the air cylinder (not shown) causes the consolidation roller mechanism 5 to return to an initial position, and then the table 11 is lifted by a lifting mechanism. Finally, the first cover is conveyed to the second stage process by a shooter.

As has been described, according to the present invention the joint portion of a tire building component material is pressure-adhered using the pressure-adhering apparatus provided separate from the tire building apparatus; hence, the time required for the pressure-adhering operation on the tire building apparatus can be saved. In addition, since the tire building apparatus and the pressure-adhering apparatus are operated in parallel, the time required for building a large number of tires can be significantly reduced.

Further, the pressure-adhering of the joint portion is mechanically achieved with the pressure-adhering apparatus; hence, the pressure at which the pressure-adhering operation is carried out and the area to be pressure-adhered are less varied thereby improving the tire uniformity.

Still further, the simplified structure of the pressure-adhering apparatus facilitates adjustments according to the size of tire.

While only certain presently preferred embodiments have been described in detail, as will be apparent with those familiar with the art, certain changes and modifications can be made without departing from the spirit and scope of the invention as defined by the following claims.

What is claimed is:

1. A method for pressure-adhering tire building component material, comprising the steps of:

(1) adhering sidewalls to a first cover, said first cover including an inner liner, a ply carcass, and a pair of bead members, one of said bead members being affixed to each end of the ply carcass by bending the end of the ply carcass to wrap up each of said bead members;

(2) cutting each of the sidewalls at a given portion thereof;

(3) initially securing a joint portion defined by the cut ends of each of the sidewalls;

(4) enfolding a bead portion with a bead edge of the sidewall and entirely pressure-adhering each sidewall to the first cover;

(5) removing the first cover from a drum upon which the steps (1) to (4) were carried out; and, (6) pressure-adhering from both inside and outside the carcass the initially secured joint portion with a machine, wherein the step (6) is carried out separately from a production assembly in which steps (1) to (5) are carried out.

2. A method for pressure-adhering tire building component material, comprising the steps, at a first production assembly, of:

(1) adhering sidewalls to a first cover, said first cover including an inner liner, a ply carcass, and a pair of bead members, one of said bead members being affixed to each end of the ply carcass by bending the end of the ply carcass to wrap up each of said bead members;

(2) cutting each of the sidewalls at a given portion thereof;

(3) initially securing a joint portion defined by the cut ends of each of the sidewalls;

(4) enfolding a bead portion with a bead edge of the sidewall and entirely pressure-adhering each sidewall to the first cover;

(5) removing the first cover from a drum upon which the steps (1) to (4) were carried out; and, then, separately from at the first production assembly in which steps (1) to (4) are performed, of:

(6) pressure-adhering from both inside and outside the carcass the initially secured joint portion with a machine.

* * * * *